United States Patent [19]

Uchida et al.

[11] 4,313,147

[45] Jan. 26, 1982

[54] PROTECTIVE DEVICE FOR COMMUNICATION SYSTEM

[75] Inventors: Susumu Uchida; Shigeo Yamamoto; Tsutomu Wadaki, all of Sagamihara, Japan

[73] Assignee: Kabushiki Kaisha Sankosah, Tokyo, Japan

[21] Appl. No.: 87,699

[22] Filed: Oct. 24, 1979

[30] Foreign Application Priority Data

Dec. 6, 1978 [JP] Japan .................................. 53-167068
May 18, 1979 [JP] Japan .................................. 54-065742

[51] Int. Cl.³ .............................................. H02H 3/22
[52] U.S. Cl. ........................................ 361/119; 179/98; 339/198 G; 339/198 S
[58] Field of Search ............... 361/119, 117; 179/98; 339/147 R, 198 R, 198 P, 198 S, 198 G, 198 GA, 198 N, 198 H

[56] References Cited

U.S. PATENT DOCUMENTS

| 3,535,463 | 10/1970 | Trucco ...................... 339/198 GA X |
| 3,800,097 | 3/1974 | Maruscak et al. ...................... 179/98 |
| 3,936,133 | 2/1976 | Splitt et al. ...................... 339/198 R |
| 4,017,768 | 4/1977 | Valfre ...................... 179/98 X |
| 4,146,755 | 3/1979 | Caussé ...................... 179/98 |
| 4,149,211 | 4/1979 | DeHoff ...................... 361/119 |

FOREIGN PATENT DOCUMENTS

403002 11/1965 Switzerland .................. 339/198 R

*Primary Examiner*—J. D. Miller
*Assistant Examiner*—Reinhard J. Eisenzopf
*Attorney, Agent, or Firm*—C. O. Marshall, Jr.

[57] ABSTRACT

A communication system protective device usable for various types of electrical communication lines, said device comprising a compact and simple arrangement of jack boards and protectors whereby an overvoltage or overcurrent induced in an outside line is prevented from being applied to the electrical communication apparatuses arranged on interior wiring to keep them safe from failure.

6 Claims, 13 Drawing Figures

PROTECTIVE DEVICE FOR COMMUNICATION SYSTEM

BACKGROUND OF THE INVENTION

In the conventional protective devices for a communication system, the jack board and plug-in protector have not necessarily been miniaturized to a satisfactory degree, so that where jack boards and plug-in protectors for accommodating several ten thousands to several hundred thousands of circuits were to be set in a system, there would be required an exceedingly large space for mounting thereof.

Also, because of a large number of parts required for constituting each unit of such jack boards and plug-in protectors in a conventional communication protective device, there were involved many steps for assemblage.

Further, since the outside line side terminals and the interior line side terminals in the conventional jack board were contrary to each other in the order of arrangement, there could be caused mis-wiring in line connections.

In the conventional jack board for a communicational protective device, in case no plug-in protector was provided, both the outside line side and interior line side of the circuit were kept open, and in case plug-in protectors were provided, both sides of the circuit were connected through said protectors. Therefore, such a jack board was useless where a non-break mechanism is required for connecting outside wiring and interior wiring of the circuit in case no plug-in protector was provided.

SUMMARY OF THE INVENTION

An object of this invention is to provide a communicational protective device for which the mounting space is minimized by use of miniaturized jack boards and plug-in protectors.

Another object of this invention is to provide a communicational protective device consisting of jack boards and plug-in protectors both of which are reduced in number of component parts to simplify the structure while facilitating assemblage of the device.

Still another object of this invention is to provide a communicational protective device in which both outside line side terminals and interior line side terminals are arrayed in the same order to prevent mis-wiring in circuit connections.

Yet another object of this invention is to provide a communicational protective device comprising a jack board which can be switched from one operational mode to the other, that is, from and to the mode in which both outside and interior sides of the circuit are open and the mode in which said both sides of the circuit are non-break connected, in case no plug-in protector is provided.

It is also an object of this invention to provide a communicational protective device in which a plurality of jack boards are integrally assembled on a mounting member so as to allow simultaneous accomplishement of both integral arrangement of the jack boards and ground connection of the plug-in protectors.

An additional object of this invention is to provide a communicational protective device including plug-in protectors which allow easy practice of tests such as monitor test, circuit change-over test, etc.

In order to accomplish said objects, there is provided according to this invention a communicational protective device using jack boards, comprising a substrate, a top plate disposed perpendicular to said substrate at the upper end thereof, jack holes formed in said top plate for receiving the corresponding terminals to the plug-in protectors, a bottom plate disposed perpendicular to said substrate at the lower end thereof, a recess formed in said bottom plate, a substrate printed on both sides comprising outside line terminals disposed at one end thereof, outside line side contact members disposed at the upper end and connected to the corresponding outside line terminals, interior line terminals disposed at the other end, interior line side contact members disposed at the upper end and connected to the corresponding interior line terminals, a ground contact piece disposed at the upper end of said substrate and a ground terminal disposed at the lower end of said substrate and connected to the ground contact piece, a contactor frame having contactor holes formed at the positions corresponding to the respective jack holes in said top plate and contactors disposed in said holes and adapted to electrically connect the respective terminals of the downwardly inserted plug-in protectors with the corresponding contact members at the upper end of said printed substrate, and a cover adapted to enclose said substrate.

Said jack board may be constructed in other forms which are capable of fulfilling the said objects.

Each plug-in protector adapted in combination with said jack board comprises two outside line terminals, two overvoltage protective elements connected in series to said outside line terminals, a ground terminal electrically connected between said overvoltage protective elements, and two interior line terminals, wherein the jacks are disposed between said interior and outside line terminals and on the side of the outside line terminals while an overcurrent protective element is connected to the side of the interior line terminals. Other arrangements of this plug-in protector are possible for attaining the said objects.

DESCRIPTION OF PREFERRED EMBODIMENTS

First, the general construction of a four-circuit jack board is described with reference to FIG. 1. The jack board 1 consists of a substrate 2, a top plate 3 disposed perpendicular to and at the upper end of said substrate, a bottom plate 4 disposed perpendicular to and at the lower end of said substrate, side plates 5, 6 erected upright on both sides of the substrate, and side erect portions 7, 8 disposed at both right and left ends of said substrate 2 in continuation to said respective side plates 5, 6. In the top plate 3 of the jack board 1 are formed holes 11 designed to receive the terminals of the respective plug-in protectors 13 for the corresponding circuits. These four plug-in protectors 13 fitted in the respective holes 11 are supported in assemblage between the side erect portions 7, 8. It will be seen that the interior line terminals 9 for four circuits are provided projecting from the side plate 5 of the jack board 1 while outside line terminals 10 are provided on the opposite side plate 6. In the bottom plate 4 of the jack board 1 is provided a recess 8 designed to receive an L-shaped angle 14 which is a mounting member for securing the jack board 1 in position. A cover plate 12 is mounted to enclose said top plate 3, side plates 5, 6 and bottom plate 4 of the jack board 1 and to accommodate therein the internal mechanism of the jack board.

Figures 1, 8:
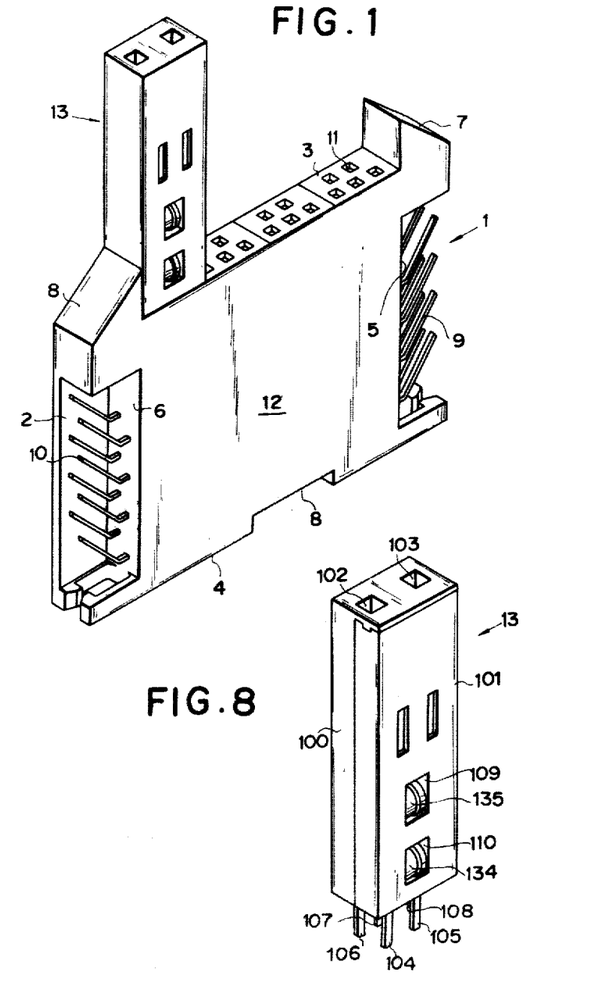
FIG. 1 is a perspective view of a jack board in accordance with this invention.
FIG. 8 is a perspective view of a plug-in protector in accordance with this invention.
Figure 2:
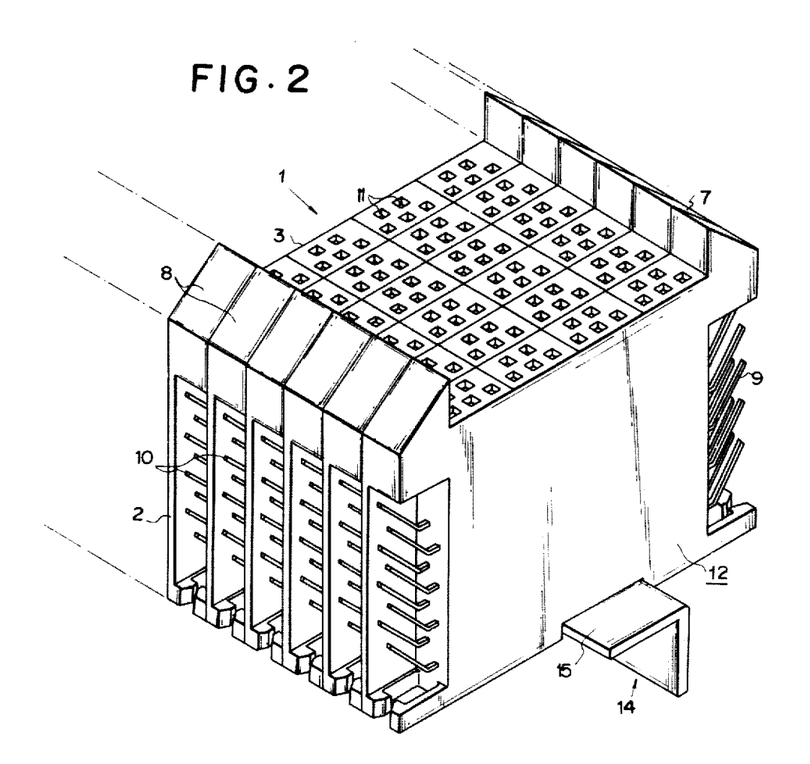
FIG. 2 is a perspective view of an assemblage of jack boards.

FIG. 2 shows an assembly of the four-circuit jack boards 1 shown in FIG. 1. It will be noted that one portion 15 of the L-shaped angle 14 is fitted in the recesses at the bottom plates 4 of the respective jack boards 1 to thereby secure the assembly of jack boards 1 in position. This L-shaped angle 14 also serves as a ground for the respective plug-in protectors 13.

Figure 3:
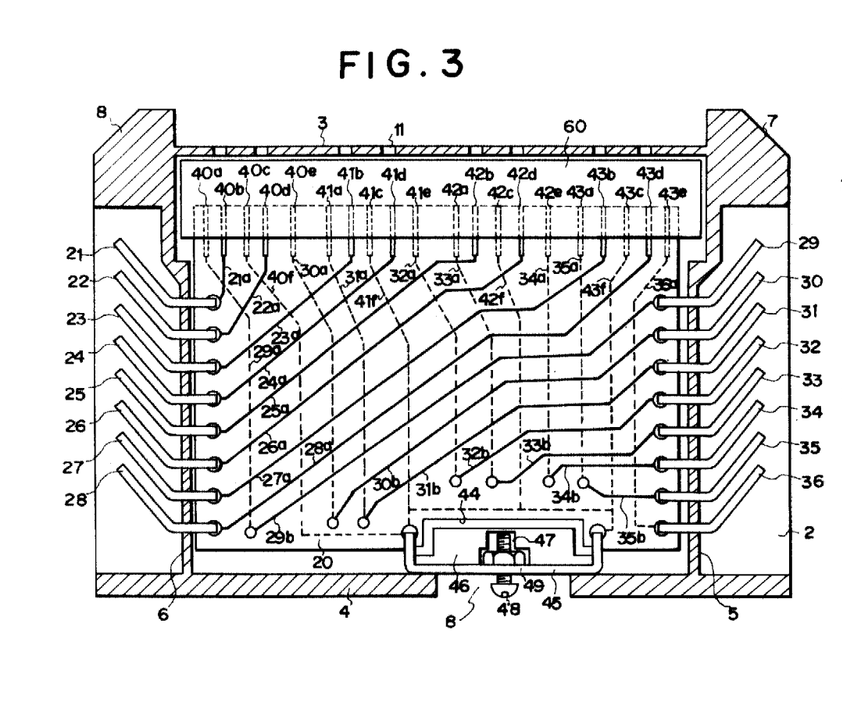
FIG. 3 is a plan view showing the internal mechanism of the jack board.
Figure 5:
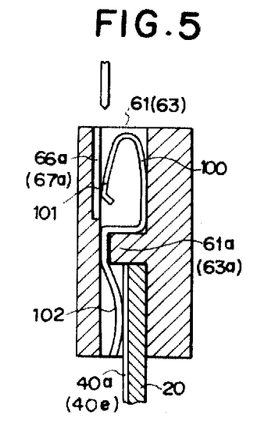
FIG. 5 is a sectional view of an interior line side contactor hole in said contactor frame.
Figure 6:
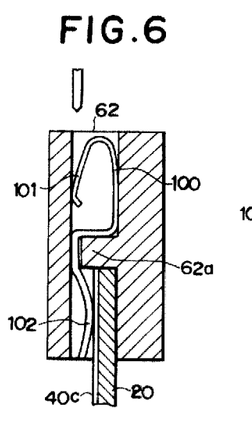
FIG. 6 is a sectional view of a ground contactor hole in said contactor frame.

Referring to FIG. 3, there is shown the internal mechanism of the jack board 1. It will be seen that a contactor frame 60 is disposed on the underside of the top plate 3 of the jack board 1, said contactor frame 60 being provided with contactor holes (see FIGS. 5 to 7) in alignment with the corresponding jack holes 11 in the top plate 3. This contactor frame 60 is also so designed that the top end of a both-side printed substrate 20 can be fitted into the bottom portion of said frame 60. At the top end of said both-side printed substrate 20 are arranged, from left to right, a first group of contact pieces 40a–40e which are connected to the plug-in protector 13 for the first circuit through the respective contactors in said contactor frame 60. There are arranged successively thereto a second group of contact pieces 41a–41e connected to the plug-in protector 13 for the second circuit through the respective contactors in the contactor frame 60, then a third group of contact pieces 42a–42e connected to the plug-in protector 13 for the third circuit through the respective contactors, and then a fourth group of contact pieces 43a–43e connected to the plug-in protector for the fourth circuit through the respective contactor in the contactor frame 60. As for the arrangement of these contact pieces 40a–43c, there are arranged the interior line side contacts on the rear side at the extreme left end, then the outside line side contacts are arranged on the front side, then the grounding contacts are arranged on the rear side, then the outside line side contacts are arranged on the front side, and then the interior line side contacts are arranged on the rear side.

It will be seen that the outside line terminals 21–28 are provided at the left end of said both-side printed substrate 20, said terminals 21–28 projecting from the side plate 6 of the jack board 1. At the right end of said substrate 20 are provided the interior line terminals 29–36 which project out from the side plate 5 of the jack board 1. At the lower end of said substrate 20 is provided a ground terminal 45 which is disposed corresponding to the recess 8 in the bottom plate 4, and a recess 44 is provided in said substrate 20 in opposition to said ground terminal 45. On the substrate 2 of the jack board 1 is provided a protuberance 46 in opposed relation with said recess 8 so that the ground terminal 45 can be inserted between said protuberance 46 and bottom plate 4. Centrally of said protuberance 46 is provided a cutout 47 designed to accommodate a bolt 48 which has been passed through the central wall of the ground terminal 45, said bolt 48 being engaged with a nut 49 disposed on the cutout 47 side. Thus, the ground terminal 45 is fastened by the bolt 48 to the L-shaped angle 14 disposed in the recess 8 and thereby the both-side printed substrate 20 is secured in position in the jack board 1.

Now, the wiring arrangement of the both-side printed substrate 20 is described. The outside line terminals 21, 22 for the first circuit are connected through front side wiring 21a, 22a to the outside line side contact pieces 40b, 40d, from which the interior line side contact pieces 40a, 40e are connected through a plug-in protector 13, rear side wiring 29a, 30a and front side wiring 29b, 30b to the interior line terminals 29, 30. The grounding contact 40c is connected via rear side wiring 40f to the ground terminal 45. The outside line terminals 23, 24 for the second circuit are connected through front side wiring 23a, 24a to the interior line side contact pieces 41b, 41d, from which the interior line side contact pieces 41a, 41e are connected through a corresponding plug-in protector 13, rear side wiring 31a, 32a and front side wiring 31b, 32b to the interior line terminals 31, 32. The grounding contact 41c for the second circuit is connected through rear side wiring 41f to the ground terminal 45. The outside line terminals 25, 26 for the third circuit are connected through front side wiring 25a, 26a to the outside line side contact pieces 42b, 42d and thence connected through a plug-in protector 13 to the interior side contact pieces 42a, 42c which are in turn connected to the interior line side terminals 33, 34 through rear side wiring 33a, 34a and front side wiring 33b, 34b. The grounding contact 42c for the third circuit is connected through rear side wiring 42f to the ground terminal 45. The outside line terminals 27, 28 for the fourth circuit are connected through front side wiring 27a, 28a to the outside line side contact pieces 43b, 43d and thence further connected through a plug-in protector 13 to the interior line side contact pieces 43a, 43e one of which 43a is further connected through rear side wiring 35a and front side wiring 35b to the interior line terminal 35 while the other 43e is connected through rear side wiring 36a to the interior line terminal 36. The grounding contact 43c for the fourth circuit is connected via rear side wiring 43f to the ground terminal 45.

Figure 4:
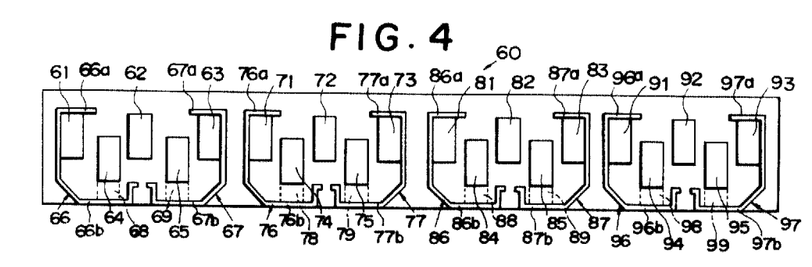
FIG. 4 is a top view of a contactor frame.

The contactor frame 60 is now described with reference to FIGS. 4 to 7, and first the arrangement of the contactor holes in the contactor frame 60 is discussed with particular reference to FIG. 4. It will be seen that an interior line side contactor hole 61 for the first circuit is provided at an upper part of the left end of the contactor frame 60, and there is provided to the right thereof a grounding contactor hole 62 for the first circuit, and an interior line side contactor hole 63 for the first circuit is provided to the right of said grounding contactor hole 62. Also, an outside line side contactor hole 64 for the first circuit is formed between and at a somewhat lower level than the interior line side contactor hole 61 and grounding contactor hole 62 for the first circuit, and an outside line side contactor hole 65 for the first circuit is formed between and at a somewhat lower level than the grounding contactor hole 62 and interior line side contactor hole 63 for the first circuit. There are also detachably mounted contact strips 66, 67 of which both end portions are disposed against the upper wall faces of said interior line side contactor holes 61, 63 and the lower wall faces of said outside line side contactor holes 64, 65. To the right of this group of contactor holes 61–65 and contact strips 66, 67 for the first circuit, there is provided a second group of similar contactor holes 71–75 and contact strips 76, 77 for the second circuit, and to the right thereof is provided a third group of similar contactor holes 81–85 and contact strips 86, 87 for the third circuit, and a fourth group of similar contactor holes 91–95 and contact strips 96,97 is provided to the right of said third group.

The construction of said contactor holes is as described below. Since all of the contactor holes 61–65-9-1-95 and contact strips 66, 67–96, 97 for the first to fourth circuits are of the same construction, explanation will here be given as to the contactor holes 61–65 and contact strips 66, 67 for the first circuit with reference to FIGS. 5 to 7. First, the construction of the interior line side contact holes 61, 63 for the first circuit is described with particular reference to FIG. 5. It will be seen that a contactor 100 is disposed in the inside of said interior line side contactor holes 61, 63. Said contactor 100 is secured in position by the raised-up portions 61a, 63a provided projecting leftwardly at the intermediate positions of said contactor holes 61, 63. The upper portion of said contactor 100 is inverted U-shaped to form an upper contact portion 101 which is always in contact at its end with the corresponding ends 66a, 67a of the contact strips 66, 67. The lower portion of said contactor 100 is gently curved to form an arcuate lower contact portion 102 which is in contact with the interior line side contact pieces 40a, 40e disposed on the rear side of the both-side printed substrate 20. Now, the construction of the grounding contactor hole 62 for the first circuit is described with reference to FIG. 6. It will be seen that a contactor 100 is disposed in the inside of the grounding contactor hole 62, said contactor 100 being secured in position by a raised-up portion 62a projecting leftwardly at the middle part of said contactor hole 62. The upper portion of said contactor 100 is inverted U-shaped to form an upper contact portion 101 which is in contact at its end with a side of the grounding contactor hole 62, and a grounding terminal 107 of the plug-in protector 13 is inserted between said side of the grounding contactor hole 62 and the end of the upper contact portion 101. The lower portion of said contactor 100 is gently curved to from an arcuate lower contact portion 102 which is connected to the grounding contact piece 40c disposed on the rear side of the both-side printed substrate 20.

Figure 7:
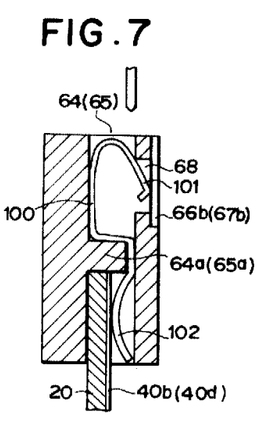
FIG. 7 is a sectional view of an outside line side contactor hole in said contactor frame.

Now, the construction of the outside line side contactor holes 64, 65 for the first circuit is described with reference to FIG. 7. A contactor 100 is disposed in the inside of said contactor holes 64, 65, said contactor 100 being secured in position by the raised-up portions 64a, 65a which project rightwardly at the middle positions of the contactor holes 64, 65. The upper portion of said contactor 100 is inverted U-shaped to form an upper contact portion 101 which is in contact at its end with the corresponding ends 66b, 67b of the contact strips 66, 67 disposed on the external side of the holes 68, 69 formed at the sides of said contactor holes 64, 65, such that when the outside line side terminals 104, 105 of the plug-in protector 13 are inserted into the corresponding contactor holes 64, 65, said upper contact portion 101 is brought into contact with the outside line side terminals 104, 105 of the plug-in protector 13 and disengaged from the ends 66b, 67b of the contact strips 66, 67.

Referring now to FIG. 8 there is shown the external construction of the plug-in protector 13 adapted in combination with the corresponding jack board 1. The plug-in protector 13, which is rectangular in general configuration, consists of a body case portion 100 and a cover case portion 101. In the top face of said protector 13 are formed holes 102, 103 for receiving the monitor plugs, and in a side thereof there are provided the holes 109, 110 designed to accommodate overvoltage protective elements 134, 135. At the bottom of said protector 13, there are provided the outside line terminals 104, 105 and, in opposed relation thereto, the interior line terminals 106, 108 and a ground terminal 107.

Figure 9:
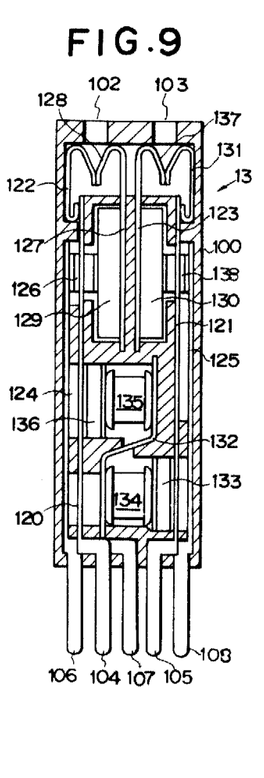
FIG. 9 is a plan view showing the internal mechanism of said plug-in protector.

We will now describe the internal construction of the plug-in protector 13 with reference to FIG. 9. It will be seen that a first outside line side connecting strip 120 and a second outside line side connecting strip 121 are disposed in opposed relation to each other in the inside of the plug-in protector 13. The lower ends of said both first and second connecting strips 120, 121 terminate in the outside line terminals 104, 105, respectively. Also, a first spring 122 for a monitor jack is provided in connection to the top end of said connecting strip 120. It will be also noticed that a first interior line side connecting strip 124 and a second interior line side connecting strip 125 are disposed outside of said first and second outside line side connecting strips 120, 121, respectively, and the lower ends of said both first and second interior line side connecting strips 124 and 125 terminate in the interior line terminals 106 and 108, respectively. At the upper end of said first interior line side connecting strip 124 is disposed a U-shaped spring 126 which extends over the adjoining outside line side connecting strip 120 downwardly thereof, and a first connecting plate 127 is provided in opposition to said U-shaped spring 126. An overcurrent protective element 129 is securely held between said first connecting plate 127 and U-shaped spring 126, said protective element 129 being made from a ceramic element which generates heat when an overcurrent is applied thereto, thereby increasing resistance to shut out the overcurrent. The upper portion of said first connecting plate 127 is bent down to provide a second spring 128 for monitor jack, which spring is in contact with said first spring 122 for monitor jack. At the upper end of said second interior line side connecting strip 125 is provided a U-shaped spring 138 which extends over the adjoining second outside line side connecting strip 121 downwardly thereof, and a second connecting plate 123 is disposed in opposition to said U-shaped spring 138. Securely held between said second connecting plate 123 and U-shaped spring 138 is another overcurrent protective element 130 which is made from a ceramic element which generates heat when an overcurrent is passed thereto, thereby increasing resistance to shut off the overcurrent. Also, the upper portion of said second connecting plate 123 is bent downwardly to provide a second spring 137 for monitor jack, which spring 137 is in contact with a first spring 131 for monitor jack. A ground connecting strip 132 is disposed intermediate said first and second outside line side connecting strips 120, 121, with the lower end of said ground connecting strip 132 terminating in a ground terminal 107. Still another U-shaped spring 133 is provided in opposition to a middle part of said ground connecting strip 132 and in contact with the second outside line side connecting strip 121, and between said U-shaped spring 133 and ground connecting strip 132 is held an overvoltage protective element 134 made from a gas-infused discharge tube. Provided in contact with the first outside line side connecting strip 120 is still another U-shaped spring 136 disposed in opposition to the upper portion of said ground connecting strip 132, and an overvoltage protective element 135 made from a gas-infused discharge tube is held between said U-shaped spring 136 and ground connecting strip 12.

Figures 10, 11:
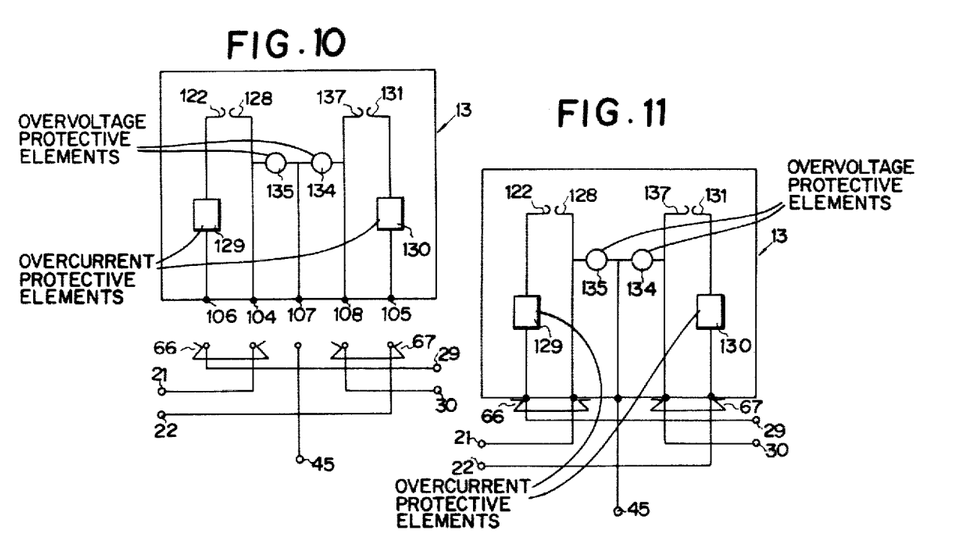
FIGS. 10 and 11 are diagrams showing the electrical connections of a plug-in protector and a jack board provided with a non-break connection mechanism.
Figure 12:
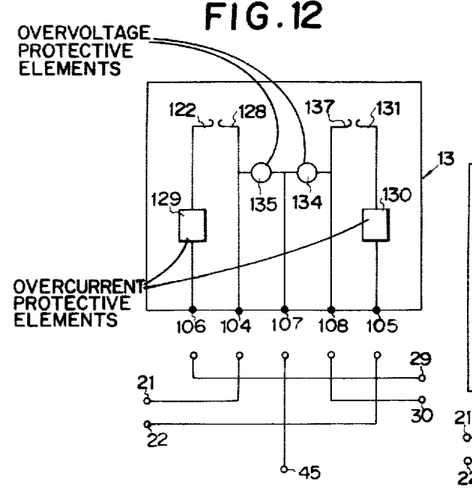
FIG. 12 shows the electrical connections of a plug-in protector and a jack board in case no non-break connection mechanism is provided.

The electrical connections of the jack board 1 and plug-in protectors 13 are now described by taking the case of the first circuit with reference to FIGS. 10 to 12. Discussed first is the case where no non-break mechanism is provided but contact strips 66, 67 are provided in the terminal frame 60 as shown in FIGS. 10 and 11. In the drawings, numbers 129, 130 indicate overcurrent protective elements, 134, 135 overvoltage protective elements, 122, 128 and 131, 137 monitoring jacks, 104, 105 outside line side terminals of the plug-in protector 13, and 106, 108 interior line side terminals of the plug-in protector 13. In the jack board 1, there are provided the outside line side terminals 21, 22, interior line side terminals 29, 30, and contact strips 66, 67. FIG. 10 shows a circuit condition where no plug-in protector 13 is provided in the jack board 1, and in this case, the outside line side terminal 21 and interior line side terminal 29 in the jack board 1 are connected to each other through contact strip 66 while the outside line side terminal 22 is connected to the interior line side terminal 30 through contact strip 67. When the plug-in protectors 13 are provided in the jack board 1 as shown in FIG. 11, the connections of outside line side terminals 21, 22 and interior line side terminals 29, 30 through contact strips 66, 67 are broken, and the outside line side terminals 21, 22 in the jack board 1 are connected to the corresponding interior line side terminals 29, 30 through the plug-in protector 13.

Figure 13:
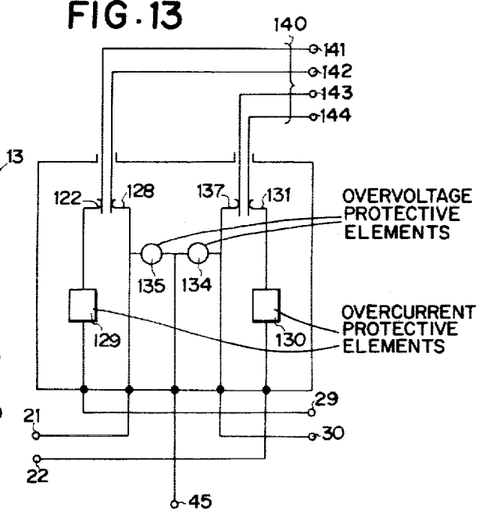
FIG. 13 is a diagram showing the electrical connections in case a monitor plug is adapted to the plug-in protector.

Considering now the case where a monitor plug 140 is adapted in the plug-in protector 13 as shown in FIG. 13, when such monitor plug 140 is set in its receiving holes 102, 103 in the plug-in protector 13, the first jack spring 122 and second jack spring 128 in said plug-in protector 13 are disconnected from each other and connected to the respective lead-out lines 141, 142 of the monitor plug 140 to lead out the circuit for monitoring use, while the first jack spring 137 and second jack spring 131 are also disconnected from each other and connected to the respective lead-out lines of the monitor plug 140. These lead-out lines 141, 142, 143, 144 are used for a circuit monitoring test, circuit change-over test, etc.

What is claimed is:

1. A protective device for communication systems, comprising a substrate, a top plate disposed perpendicular to said substrate at the upper end thereof, jack holes formed in said top plate and designed to receive terminals of plug-in protectors, a bottom plate disposed perpendicular to said substrate at the lower end thereof, a recess provided in said bottom plate, a both-side printed substrate comprising outside line terminals arranged at one end thereof, outside line side contact pieces disposed at the upper end thereof and connected to the respective outside line terminals, interior line terminals arranged at the other end thereof, interior line side contact pieces disposed at the upper end thereof and connected to the respective interior line terminals, and a grounding contact piece disposed at the upper end thereof and a ground terminal disposed at the lower end thereof and connected to said grounding contact piece, a contactor frame disposed on the underside of said top plate and comprising contactor holes formed in alignment with said respective jack holes in said top plate and contactors disposed in said respective contactor holes and arranged such that the contact pieces at the upper end of said both-side printed substrate are electrically connected from the lower side thereof, a cover adapted to enclose said substrate, the outside line terminals disposed at one end of the both-side printed substrate being arrayed in the same order as the array of the corresponding interior line terminals disposed at the other end of said substrate, contact strips adapted detachably to enclose the outside and interior line side contactor holes in the contactor frame, said contact strips being arranged such that when they are mounted, the contactors in the outside line side contactor holes are connected to the corresponding contactors in the interior line side contactor holes through said contact strips, and when plug-in protectors are set in position, the contactors in the outside line side contactor holes are connected to the corresponding contactors in the interior line side contactor holes through said plug-in protectors, and when said contact strips are removed and plug-in protectors are mounted in position, the contactors in the outside line side contactor holes are connected to the corresponding contactors in the interior line side contactor holes through said plug-in protectors.

2. A communicational protective device as claimed in claim 1, comprising a plurality of jack boards arranged integrally in juxtaposition and a member for securing said respective jack boards in position, said member being fixedly inserted into the recesses in the bottom plates of said respective jack boards and having also secured thereto the ground terminals in said respective jack boards.

3. A communication protective device having plug-in protectors each comprising two outside line terminals, two overvoltage protective elements each connected to one of said outside line terminals, a ground terminal connected between said overvoltage protective elements, two interior line terminals, an overcurrent protective element connected between each of said interior line terminals and an outside line terminal, a jack disposed between each of said overvoltage protective elements and the outside line terminal, a first outside line side connecting plate forming an outside line terminal at its lower end, a second outside line side connecting plate disposed parallel to said first connecting plate and forming an outside line terminal at its lower end, a ground connecting plate disposed between said first and second connecting plates and forming a ground terminal at its lower end, the upper portion of said ground connecting plate being spaced-apart from and parallel to said first outside line side connecting plate and the lower portion being spaced-apart from and parallel to said second outside line side connecting plate, an overvoltage protective element connected between said ground connecting plate and said second outside line side connecting plate through a U-shaped spring, another overvoltage protective element connected between said ground connecting plate and said first outside line side connecting plate through a second U-shaped spring, a third spring for a monitor jack connected at its upper end to said first outside line side connecting plate, a first connecting strip of which the upper portion forms a fourth spring for a monitor jack contacting with said third spring and the lower portion is disposed parallel to said first outside line side connecting plate, a fifth spring for a monitor jack connected at its upper end to said second outside line side connecting plate, a second connecting strip of which the upper portion forms a sixth spring for a monitor jack contacting with said fifth spring and the lower portion is disposed parallel to said second outside line side connecting plate, a first interior line side connecting plate disposed outside of said first outside line side connecting plate and forming an interior line side terminal at its lower end, an overcurrent protective element connected between the upper portion of said first interior line side connecting plate and the lower portion of said first connecting strip through a third U-shaped spring, a second interior line side connecting plate disposed outside of said second outside line side connecting plate and forming an interior line side terminal at its lower end, and an overcurrent protective element connected between the upper portion of said second interior line side connecting plate and the lower portion of said second connecting strip through a fourth U-shaped spring.

4. A communicational protective device having plug-in protectors as claimed in claim 3, comprising a substantially rectangular casing designed such that the respective terminals project from the underside of the bottom portion thereof, said casing having provided in its one side holes for receiving the overvoltage protective elements and also having provided in its upper portion holes for receiving monitor plugs.

5. A communicational protective device having plug-in protectors as claimed in claim 3 or claim 4, wherein a gas-infused discharge tube is used as an overvoltage protective element.

6. A communicational protective device having plug-in protectors as claimed in claim 3 or claim 4, wherein each overcurrent protective element is a ceramic element which generates heat upon passage of an overcurrent to increase resistance to shut off such overcurrent.

* * * * *